US008499212B2

(12) United States Patent
Wu et al.

(10) Patent No.: US 8,499,212 B2
(45) Date of Patent: Jul. 30, 2013

(54) METHOD AND APPARATUS FOR ADAPTIVE FORWARD ERROR CORRECTION WITH MERGED AUTOMATIC REPEAT REQUEST FOR RELIABLE MULTICAST IN WIRELESS LOCAL AREA NETWORKS

(75) Inventors: Mingquan Wu, Princeton Junction, NJ (US); Hang Liu, Yardley, PA (US)

(73) Assignee: Thomson Licensing, Issy les Moulineaux (FR)

( * ) Notice: Subject to any disclaimer, the term of this patent is extended or adjusted under 35 U.S.C. 154(b) by 456 days.

(21) Appl. No.: 12/739,235

(22) PCT Filed: Oct. 23, 2007

(86) PCT No.: PCT/US2007/022453
§ 371 (c)(1),
(2), (4) Date: Apr. 22, 2010

(87) PCT Pub. No.: WO2009/054822
PCT Pub. Date: Apr. 30, 2009

(65) Prior Publication Data
US 2010/0260180 A1    Oct. 14, 2010

(51) Int. Cl.
*H03M 13/00* (2006.01)
(52) U.S. Cl.
USPC .......................................... 714/751; 714/752
(58) Field of Classification Search
USPC .................................................. 714/751, 752
See application file for complete search history.

(56) References Cited

U.S. PATENT DOCUMENTS

| 6,421,387 | B1 * | 7/2002 | Rhee ........................ 375/240.27 |
| 2002/0080816 | A1 * | 6/2002 | Spinar et al. ................... 370/449 |
| 2002/0114283 | A1 * | 8/2002 | Lee ................................ 370/252 |
| 2002/0118638 | A1 * | 8/2002 | Donahue et al. ............... 370/229 |
| 2003/0149930 | A1 * | 8/2003 | Rey et al. ....................... 714/776 |
| 2005/0172199 | A1 * | 8/2005 | Miller et al. ................... 714/749 |
| 2005/0232193 | A1 * | 10/2005 | Jorgensen ..................... 370/329 |
| 2006/0233116 | A1 | 10/2006 | Kyusojin |
| 2008/0028279 | A1 * | 1/2008 | Ver Steeg ....................... 714/776 |
| 2008/0085051 | A1 | 4/2008 | Yoshii |

FOREIGN PATENT DOCUMENTS

| JP | 09116559 | 5/1997 |
| JP | 2002359641 | 12/2002 |
| JP | 2004517534 | 6/2004 |
| JP | 2004201111 | 7/2004 |

(Continued)

OTHER PUBLICATIONS

Tong Gan et al., Expected Run-Time Distortion Based Scheduling for Scalable Video Transmission With Hybrid FEC/ARQ Error Control, 2007 IEEE, Interuniversity Microelectronics Center, Leuven, Belgium.

(Continued)

*Primary Examiner* — Yolanda L Wilson
(74) *Attorney, Agent, or Firm* — Robert D. Shedd; Jeffrey M. Navon; Catherine A. Cooper

(57) ABSTRACT

A method and apparatus are described for increasing multicasting reliability, including receiving content and a first layer of a plurality of a forward error correction coded packets from a first multicast group and joining an additional multicast group in order to receive one of additional layers of forward error correction coded packets and the content along with a further additional layer of the plurality of forward error correction coded packets.

40 Claims, 5 Drawing Sheets

FOREIGN PATENT DOCUMENTS

| | | |
|---|---|---|
| JP | 2007243439 | 9/2007 |
| WO | WO02052862 | 7/2002 |
| WO | 2006/009105 A1 | 1/2006 |
| WO | WO2006013459 | 2/2006 |

OTHER PUBLICATIONS

International Search Report dated Feb. 20, 2009 for PCT/US2007/022453.

Luo, Yun-feng, et al., Realiable Real-Time Stream-Media Communication Based on FEC/ARQ, J Wuhan Univ, Nat. Sci Ed, vol. 48 No. 5, pp. 626-630.

Chou, Philip A., "Error Control for Receiver-Driven Layered Multicast Audio and Video," IEEE Transactions on Multimedia, Mar. 1, 2001, vol. 3, No. 1, pp. 108-122.

\* cited by examiner

METHOD AND APPARATUS FOR ADAPTIVE FORWARD ERROR CORRECTION WITH MERGED AUTOMATIC REPEAT REQUEST FOR RELIABLE MULTICAST IN WIRELESS LOCAL AREA NETWORKS

This application claims the benefit, under 35 U.S.C. §365 of International Application PCT/US2007/022453, filed Oct. 23, 2007, which was published in accordance with PCT Article 21(2) on Apr. 30, 2009 in English.

FIELD OF THE INVENTION

The present invention relates to wireless communication networks and, in particular, to increasing reliability of multicast applications by applying a combination of forward error correction and automatic repeat request.

BACKGROUND OF THE INVENTION

As used herein "content" is used to include audio, video and any other form of data including any multimedia data. The terms video and content are used interchangeably herein. As used herein, "/" denotes alternative names for the same or similar components or structures. That is, a "/" can be taken as meaning "or" as used herein.

Wireless local area networks (WLANs), because of their flexibility and low cost, have been used extensively in homes, hotels, on campus and other hot spots such as airports and train stations. While in most cases, users connect to a WLAN to browse websites or check e-mails, there is an increasing demand for WLANs to support real time multimedia streaming. However, a wireless channel may suffer from multi-path fading and interferences, which may cause random and burst packet losses and impact the content playback quality of a streaming application. To improve reliability, error correction schemes such as forward error correction (FEC) and/or automatic repeat request (ARQ) can be used. In FEC, parity packets are sent with the original/source media packets/data. However, as each mobile device may experience different channel conditions, it is difficult to decide how much FEC to send. Lower FEC may cause poor protection and lost packets/data may not be able to be recovered. Higher FEC may cause more overhead and waste network bandwidth. The present invention describes an adaptive method, which give a client/mobile device the appropriate protection while at the same time using the bandwidth resource efficiently.

Using ARQ for error correction, a client/mobile device's data/packet recovery may suffer a long round trip time delay. In multicast applications, ARQ may also result in feedback explosion problem. However, when the round trip time delay is short, and appropriate feedback suppression algorithm is used, ARQ is still a feasible error correction scheme for real time content streaming.

FEC is an efficient way to improve reliability for multicast applications. A variety of FEC schemes can be employed at the application layer for packet level error correction. The candidates include Pro-MPEG with/without random interleaving and Reed-Solomon (RS). All FEC schemes have advantages and disadvantages. Pro-MPEG FEC is a very light scheme since it only employs XOR operation but its error correction capability is correspondingly limited. Pro-MPEG cannot correct some error patterns even if the packet losses are not high. RS has better error correction capability than XOR-based FEC schemes in most of cases, since it works independently of error patterns. The cost of employing RS is increased computational resources. Nevertheless, in some cases RS has lower performance than XOR-based FEC schemes, since RS (n, k) code completely fails in cases of more than n-k packet losses out of n encoded packets in a FEC coding block. XOR based FEC can possibly still correct part of the missing packets/data when there are more than n-k packet losses.

The problem with FEC is to decide how much FEC to send in the first place. In a multicast application, different mobile devices may have different channel conditions and loss rates. A single static FEC cannot satisfy the requirements of all the mobile devices. Layered FEC is introduced in the prior art coupled with scalable source coding to improve the bandwidth usage efficiency and quality of service in wired networks. However, prior art schemes did not consider ARQ retransmission. If the packet loss for a receiver is more than the capability of the FEC code, the lost packets cannot be recovered. Furthermore, a receiver cannot get the exact amount of FEC packets it needs because it gets the FEC in layers, in a discrete number of FEC packets. In addition, the prior art layered scheme did not consider the synchronization between multiple tracks of a multimedia session. For example, in a multimedia session, often there is an audio track and a video track, the video track has much higher bit rate than the audio track, if the same FEC block size is used, it will take much longer time for the audio track to fill up the FEC buffer.

In one prior art solution, the maximum number of packets (maxK) that will be used for FEC encoding in a FEC block is set. When the number of video (audio) packets for a track in the buffer reaches maxK, the FEC encoding based on these video (audio) packets is performed. At the same time, the FEC encoding based on the other tracks of the audio (video) media packets is also performed, no matter how many packets is in the other audio (video) track buffer. Because both N and K are not fixed for different FEC blocks, N and K must be included in the FEC header and the information, thereby, passed to the client.

In the prior art ARQ has been used in multicast when the average round trip time from clients to server is low and the number of clients in a multicast session is small. Often feedback suppression is implemented to avoid the feedback explosion problem. In prior art hybrid ARQ schemes, a client/mobile device sends request for the number of parity packets it needs to decode a FEC block instead of the sequence number of the original media packets. The retransmitted parity packets are multicast to all the clients in the multicast session. Parity packets can be used by different clients/mobile devices to recover different losses.

Different scenarios may use different error correction schemes. In some cases, FEC may be more efficient while in other cases, ARQ maybe a better choice. It would be advantageous to provide a single solution for all the application scenarios.

SUMMARY OF THE INVENTION

The present invention describes an adaptive method for increasing the reliability of multicast applications in WLANs by applying a combination of forward error correction and automatic repeat request. In a wireless broadcast/multicast system, packets/data may suffer from random and burst losses because of multi-path fading, interference, handoff situations, etc. To improve reliability, error correction schemes such as forward error correction (FEC) and automatic repeat request (ARQ) can be adopted. There are advantages to combining FEC and ARQ. Combining FEC and ARQ can increase the system implementation flexibility and improve the performance of the system in specific scenarios. The present invention describes a combined scheme, denoted herein as a merged hybrid ARQ scheme, or mhARQ. In the mhARQ system of the present invention, FEC packets are coded and divided into one or more adaptive FEC multicast groups and an ARQ multicast group. A WLAN broadcast/multicast system can thus be configured to use ARQ or adaptive FEC or both in a multicast application.

A method and apparatus are described for increasing multicasting reliability, including receiving content and a first layer of a plurality of a forward error correction coded packets from a first multicast group and joining an additional multicast group in order to receive one of additional layers of forward error correction coded packets and the content along with a further additional layer of the plurality of forward error correction coded packets. Also described are a method and system for increasing multicasting reliability, including generating a plurality of layers of forward error correction coded packets, transmitting content and a first layer of said plurality of the forward error correction coded packets, transmitting a second layer of the plurality of the forward error correction coded packets upon request, transmitting a third layer of the plurality of the forward error correction coded packets upon receipt of an automatic repeat request message and re-transmitting the content and a fourth layer of the plurality of the forward error correction coded packets, upon receipt of an automatic repeat request content request.

It should be noted that each of the layers of FEC packets could be multiple multicast groups. That is, the second layer described above could, in fact, be several sub-layers transmitted by multiple multicast groups. For the second layer, there are or could be several multicast groups. For each multicast group, the delay time is different (and configurable). A client/mobile device need not join all of the multicast groups in this layer but need only join the multicast groups that it needs in order to receive enough FEC/parity packets to recover the content.

BRIEF DESCRIPTION OF THE DRAWINGS

The present invention is best understood from the following detailed description when read in conjunction with the accompanying drawings. The drawings include the following figures briefly described below.

DETAILED DESCRIPTION OF THE PREFERRED EMBODIMENTS

Different scenarios may use different error correction schemes. In some cases, FEC may be more efficient while in other cases, ARQ maybe a better choice. In some scenarios these two schemes may be combined together to improve performance. It would be advantageous to provide a single solution to all the application scenarios.

The present invention describes an adaptive method for increasing the reliability of multicast applications in WLANs by applying a combination of forward error correction and automatic repeat request. In a wireless broadcast/multicast system, packets/data may suffer from random and burst losses because of multi-path fading, interference, handoff situations, etc. There are advantages to combining FEC and ARQ. Combining FEC and ARQ can increase the system implementation flexibility and improve the performance of the system in specific scenarios. In the mhARQ system of the present invention, FEC packets are coded and divided into one or more adaptive FEC multicast groups and an ARQ multicast group. A WLAN broadcast/multicast system can thus be configured to use ARQ or adaptive FEC or both in a multicast application. That is, the present invention is a single integrated data/packet recovery solution for multicast multimedia content applications. As used herein, the term "group" denotes multicast group unless indicated otherwise.

Figure 1:
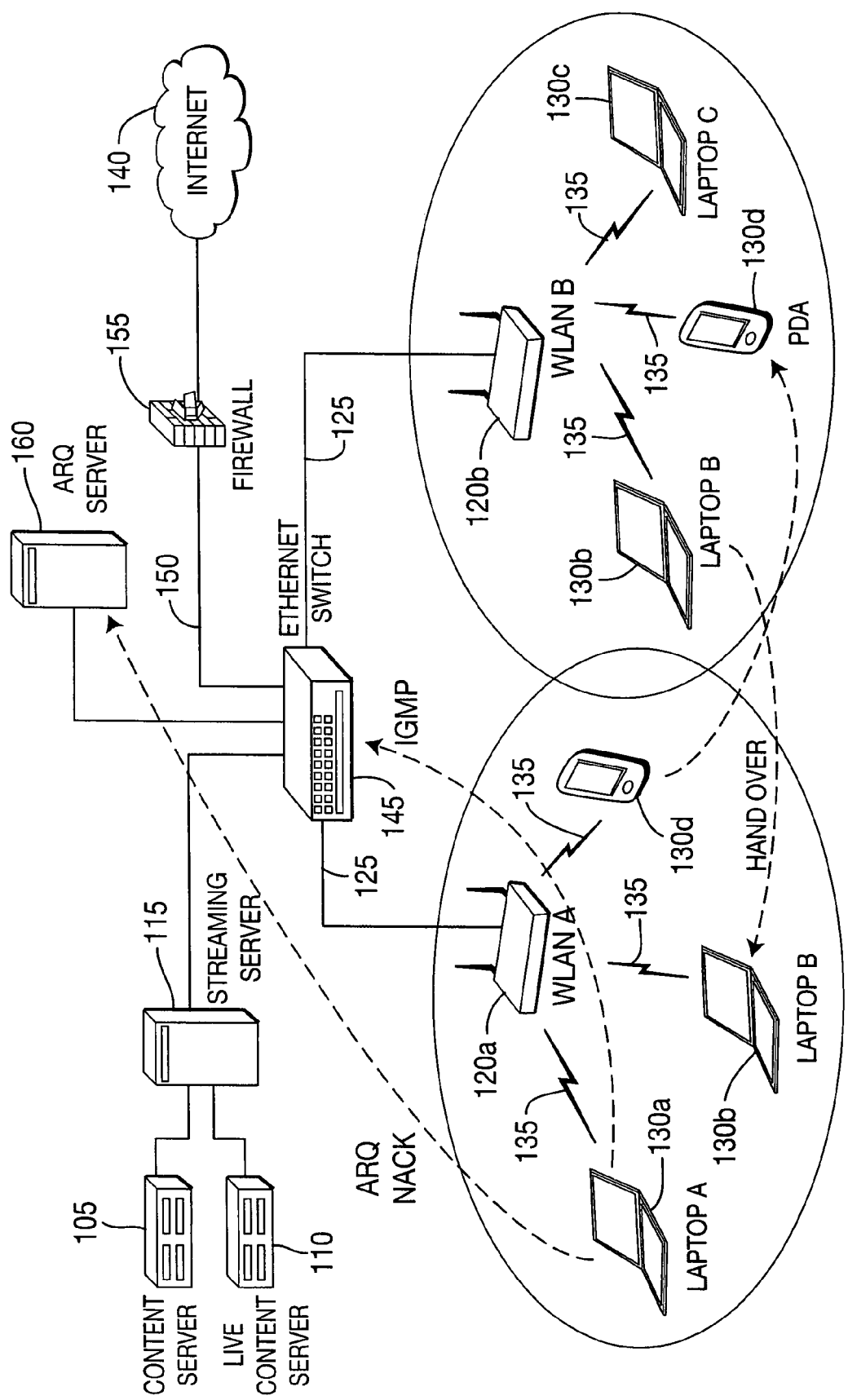
FIG. 1 shows a typical wireless LAN video distribution system for hotspot multimedia content WLANcasting (multicasting over a WLAN) applications.

FIG. 1 shows a typical wireless LAN distribution system for hotspot multimedia content WLAN casting (multicasting over a WLAN) applications. The content servers (content on demand 105 and live content 110) are connected to the wireless access points 120a, 120b through a high-speed Ethernet LAN 125. The content servers (content on demand (COD), live content) 105, 110 multicast one or more programs (audio and/or video) over the high-speed wired network to the wireless access points 120a, 120b. Application layer FEC is performed and FEC packets are sent in non-delayed and delayed FEC multicast groups by a streaming server 115 to provide error recovery capability. The access points 120a, 120b distribute the content to the wireless devices 130a, 130b, 130c; 130d in multicast over the wireless links 135. The users of the wireless devices 130a, 130b, 130c, 130d can view one or more programs and simultaneously access the Internet 140. Access to the Internet 140 is via wireless links 135, an appropriate WLAN access point 120a, 120b, a high-speed Ethernet LAN 125 and Ethernet switch 145, a communication link 150 and possibly a firewall 155. ARQ server 160 receives NACKS from clients/mobile devices and sends ARQ FEC packets. In some cases the ARQ server and the streaming server can be co-located in one apparatus/machine/device. A client/mobile device joins an ARQ FEC group via IGMP, if delayed FEC packets were not enough to recover the lost/damaged packets/data.

Figure 2:
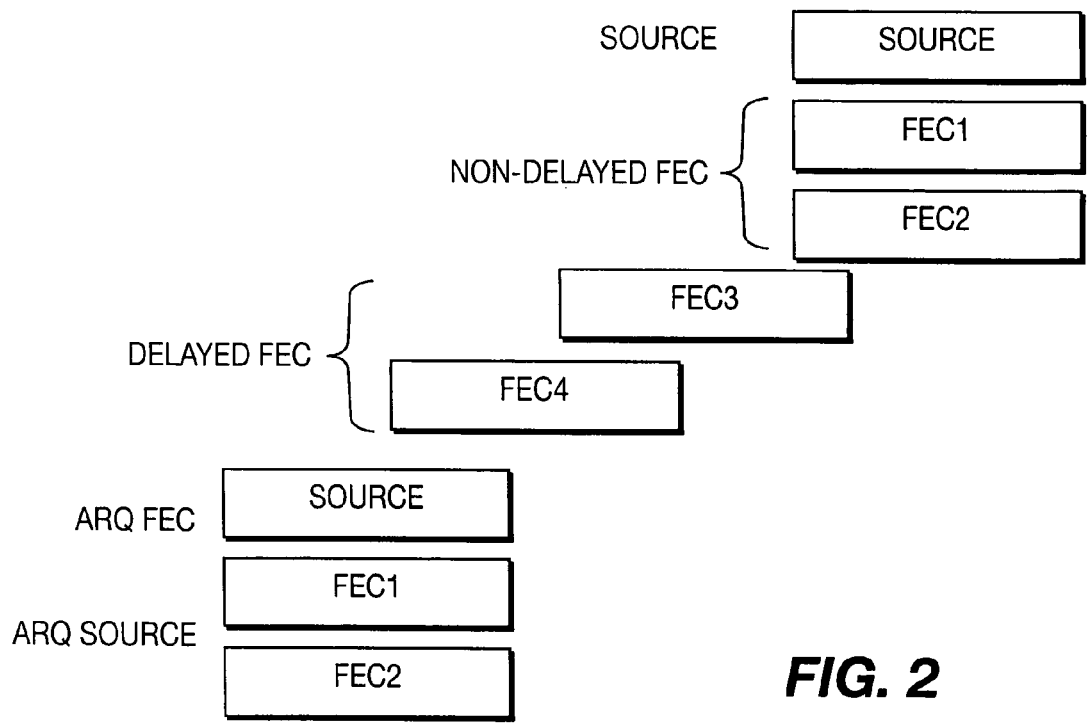
FIG. 2 shows the three types of FEC groups for a source stream.

The FEC packets for a content/source/video/audio stream are divided into different layers. Each layer is transmitted in a different multicast group. As shown in FIG. 2, there are three types of FEC groups for a source stream:

Non-delayed FEC groups: The FEC packets in these groups are not delayed from the content/source, i.e. these FEC packets are sent as soon as they are generated. For random loss recovery, a client/mobile device joins one or more non-delayed FEC groups based on its "long-term" channel conditions. If the membership is static or "semi-static" (in minutes), the client/mobile device does not need to join delayed FEC groups or send ARQ. Non-delayed FEC reduces the feedback traffic from the clients/mobile devices.

Delayed FEC groups: The transmission of FEC packets in these groups are delayed from the media packets by a configurable time. Using Internet Group Management Protocol (IGMP), a client/mobile device dynamically (per FEC block) joins/leaves the delayed FEC groups if non-delayed FEC packets are not enough to recover data/content loss. If the join time is greater than the time shift between content and delayed FEC, the corresponding parity packets will be received to recover the lost content/data packets by the client/mobile device. To save wireless bandwidth, delayed FEC data for a multicast group would not be transmitted by the AP/router 120a, 120b in wireless network if no clients/mobile devices associated with the AP/router join this particular group.

ARQ FEC Groups: The FEC packets in the ARQ FEC groups are sent according to the NACK from the clients/mobile devices. A client/mobile device sends the NACK to the ARQ server and joins the corresponding ARQ FEC groups via IGMP if delayed FEC packets are not enough to recover the lost packets/data.

ARQ Source/Content Groups: If the number of lost packets exceeds a threshold, the ARQ server may retransmit the original block of media packets in a multicast group. The reason is that FEC is used to either recover all the lost/damaged packets/data or none of the lost/damaged packets/data. When there are a lot of lost/damaged media packets/data, the receiver is at least able to receive some of the retransmitted media packets.

For flexibility, the number of non-delayed and delayed FEC groups, the time shift between content stream and delayed FEC streams, as well as the quantity of FEC in non-delayed, delayed FEC groups and ARQ FEC groups can be configured.

Figure 3:
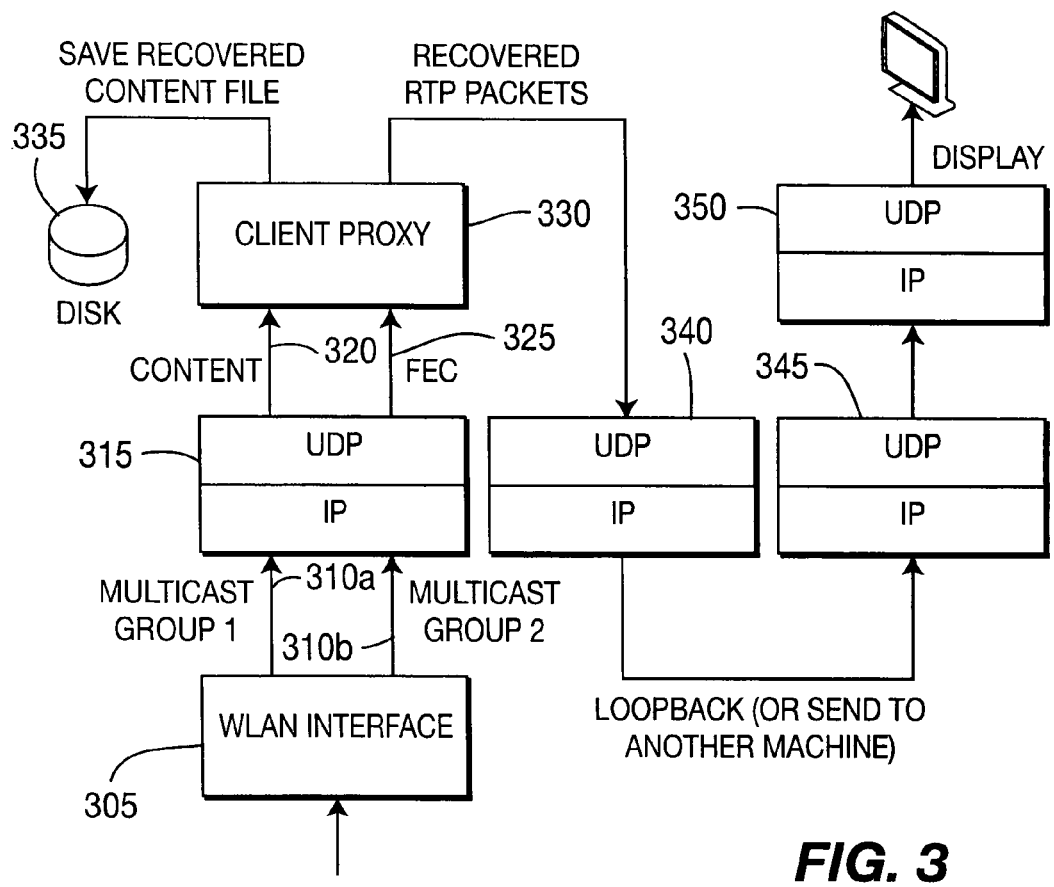
FIG. 3 is a schematic/block diagram of the client/mobile device of the merged hybrid ARQ method of the present invention.

Available commercial and freeware content/video players, e.g. Quicklime, Thomson Multimedia Application Framework (MMAF), and VideoLAN Client (VLC) players, do not support FEC. Source code is generally not available for commercial players. It is difficult to integrate FEC into every freeware player as well as maintain and update the source code even if the source code of freeware is available. The present invention includes a client proxy architecture as shown in FIG. 3. The client proxy can work with any commercial and freeware video players without any requirement to change the player code. The client proxy receives media and FEC packets from different multicast groups, joins and leaves the FEC multicast groups, sends ARQ NACKs to the ARQ server, receives retransmitted FEC and media packets, recovers lost media packets and sends the recovered media packets to the player through a communication socket.

Referring still to FIG. 3, the client/mobile device receives content from the content servers 105, 110 via the WLAN interface 305 (via a WLAN access point 120a, 120b). The client/mobile device can concurrently be a member of multiple multicast groups (content, FEC, delayed FEC, ARG FEC, ARQ Source/Content) each indicated by a separate flow (31.0a, 310b) through a common User datagram protocol/internet protocol (UDP/IP) protocol stack 315. At the common UDP/IP protocol stack 315, the content 320 and FEC packets 325 are separated and enter the FEC client proxy module 330 of the present invention. The recovered content can be stored in a storage system 335, which could include any form of storage such as discs, tape, CDs, memory, DVDs etc for later playback, or the recovered content can be sent to a player (or any suitable and available display device) 355 via a communication socket, which includes UDP/IP protocol stacks 340 and 345 and UDP/IP protocol stack 350 at the display device 355.

At the content server side, before the FEC encoding operation is performed, a certain number of media packets (K) are buffered. Multimedia content may include multiple tracks, e.g. video track and audio track. The FEC encoding operation is performed on each track respectively. Different media tracks have different bit rates, usually video has a higher bit rate than audio. Using the same FEC block size for both video and audio will cause an audio/video synchronization problem at the receiver. For example, when the number of video packets in the video buffer reaches K, FEC encoding is performed on these packets, the video FEC packets are sent out and the buffer is emptied for the next block; at the same time the number of audio packets in the audio buffer may still have to wait a unspecified time before it reaches K. One approach is to use different block size for video and audio. For certain block size of video, however, how to select the block size for audio is a design problem. Different content may require different block size pairings between the audio and video tracks. Even for the same content, variant bit rate content may need different Ks for audio and video at different times.

For variant bit rate stream, the time to fill a fixed number of media packets in a buffer may vary. To further combat the playback jitter that may be incurred because of FEC buffering, a maximum buffer time (maxT) is set for a FEC block in the present invention. If the buffering time for the first packet in the video or audio FEC buffer is equal to or greater than maxT, or the number of video (or audio) packets for a track in the buffer reaches maxK (a maximum buffer size), the FEC encoding on the packets of both video and audio tracks of the multimedia content is performed.

For real time applications, using variant N and K can solve the audio and video synchronization problem but may cause extra encoding and decoding overhead, because the generating matrix for different N and K are different, and creating generating matrices is very computationally expensive. To improve the encoding and decoding efficiency, both maxK and maxN are fixed in the present invention. The generating matrix is created based on maxK and maxN, and is initialized only once on both server and client side. All (N, K) codes, $K \leq maxK$ and $N \leq maxN$. thus can be generated using the initial generating matrix based on punctured/shortened codes, which dramatically reduces the encoding and decoding time.

The functional details of client proxy 330 are shown in detail FIGS. 4A, 4B, 4C and 4D. The functions/acts/steps of the client proxy can be implemented in software, hardware, firmware, application specific integrated circuits (ASICs) and/or field programmable gate arrays (FPGAs) or any combination of the above or any other suitable means. The client proxy receives and buffers received FEC and media packets, estimates the channel conditions based on the packet losses. If the client proxy cannot recover the original message from a FEC block, the client proxy will join more delayed FEC groups and/or send an ARQ request for the retransmission of more FEC or original media packets. An ARQ feedback suppression algorithm is also implemented at the client proxy. If some packets are lost/damaged but the FEC block can be decoded, the client proxy will recover the lost/damaged packets from the parity (FEC) packets and send the recovered media packets to the player. If the packets are lost/damaged and the client proxy cannot decode the FEC block, when the buffer timer expires, the client proxy will send the received media packets to the player even if some media packets are lost and cannot be recovered.

The tasks of the client proxy are performed by three separate threads. The main thread will receive and buffer media/parity packets. The main thread will also receive and process ARQ requests from other clients/mobile devices in the multicast group. The main thread will also perform channel estimation, adaptive FEC processing and FEC decoding. ARQ processing and packet forwarding are performed by the second and third thread respectively.

Figure 4D:
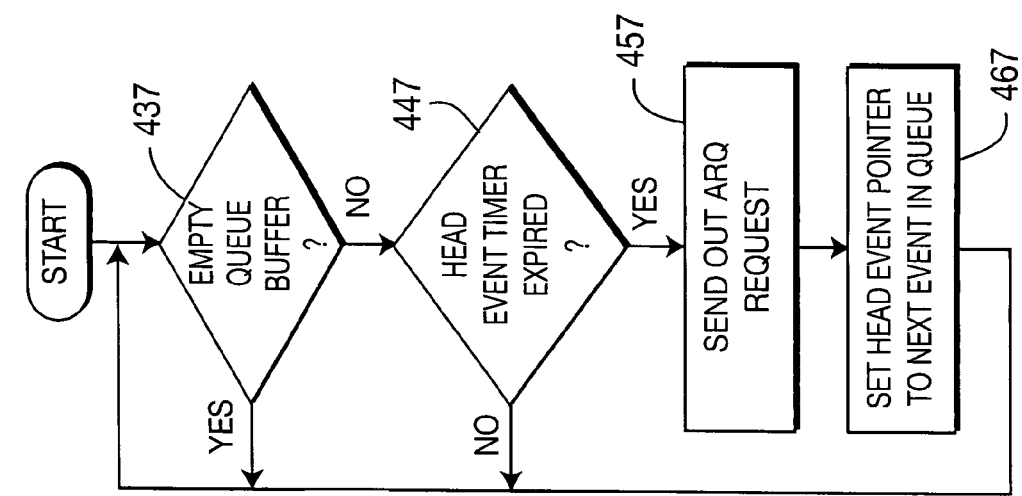
FIGS. 4A, 4B, 4C and 4D taken together are the flowcharts of the three threads of processing in the client proxy module

Referring back to FIGS. 4A, 4B, 4C and 4D, which together show the method practiced at the client proxy module 330 of FIG. 3. FIG. 4A is the main routine and the source buffer is initialized at 405. At 410, the packet forwarding process (second) thread is invoked. The ARQ event queue is initialized at 415. The ARQ event process (third) thread is invoked at 420. Finally the main/first thread that handles media packet receipt, buffering of the media packets and error recovery etc. is invoked at 425.

Figure 4C:
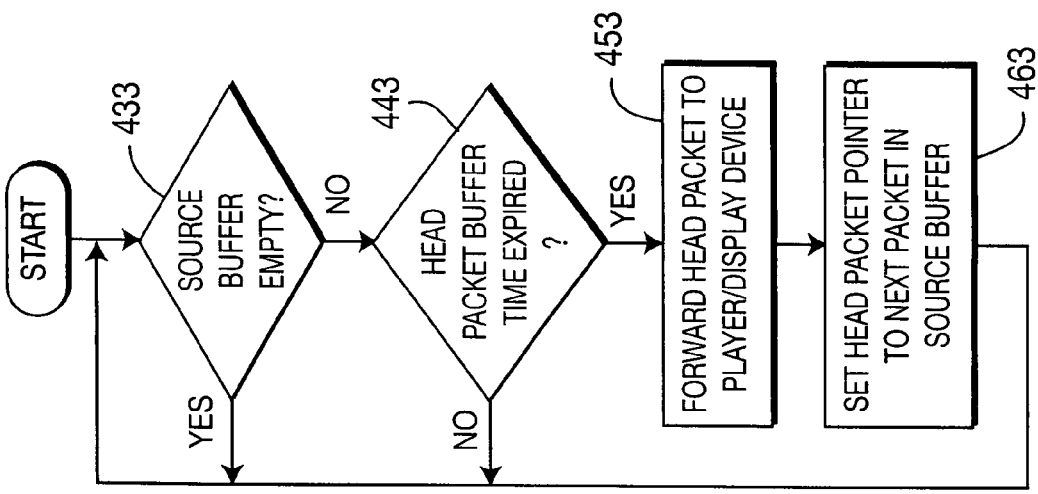
Figure 4A:
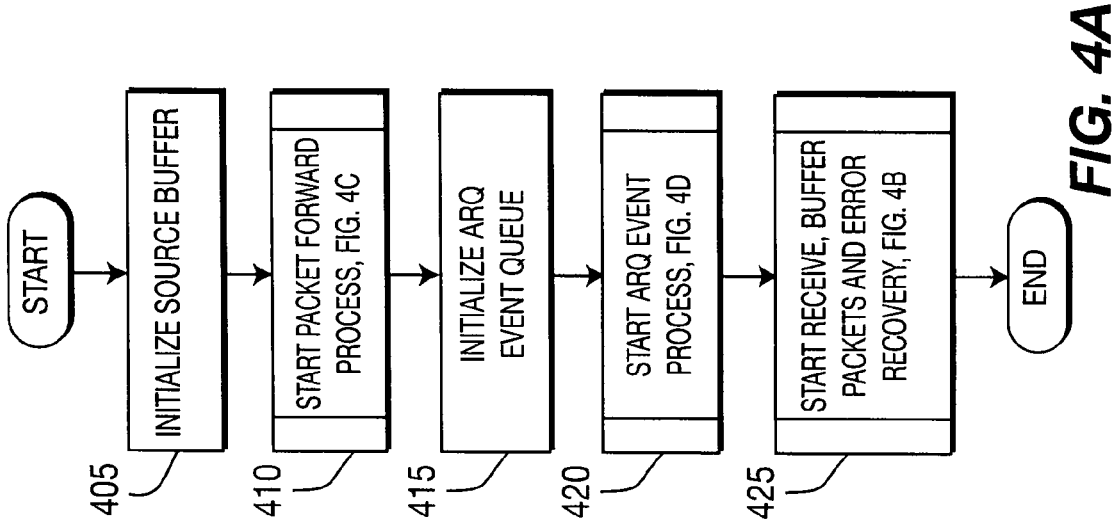
Figure 4B:
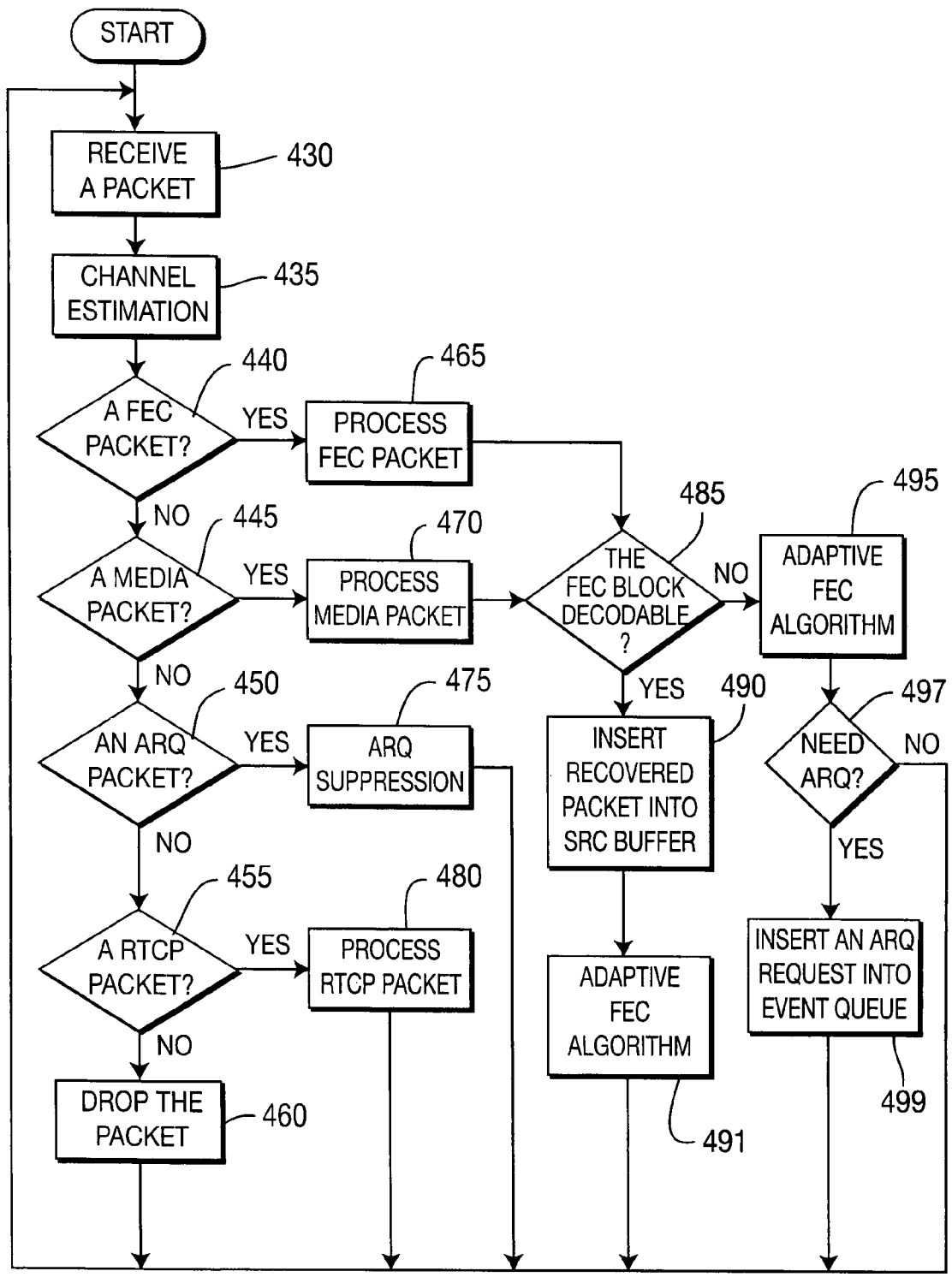

FIG. 4B is a flowchart of the main/first thread of the method practiced by the client proxy module 330 of FIG. 3. At 430 a packet is received. The channel conditions are estimated at 435. A test is performed at 440 to determine if the received packet is a FEC packet. If the received packet is a FEC packet, the packet is processed at 465. When a client/mobile device receives a parity (FEC) packet, the client/mobile device gets all the information about the FEC block to which this parity packet belongs (in which the parity/FEC packet is included) from the FEC block header. The client/mobile device first checks if a block data structure has been allocated to the FEC block. If a block data structure has not yet been allocated, then a block data structure is allocated. A FEC block is inserted into the data structure (e.g., linked list) according to its base sequence number. The base sequence number of a FEC block is the smallest sequence number of the media packets that belong to (are included in) this FEC block. After a FEC block has been allocated, the client/mobile device looks into the source buffer and marks the media packets that belong to this FEC block, and updates the information (such as how many packets are lost, which packets are lost, etc.) corresponding to this block. A test is performed at 485 to determine if the FEC block was decodable. After a FEC block has been allocated, the client/mobile device is able to look into the source buffer and retrieve information (such as how many packets are lost, which packets are lost, etc.) corresponding to this block and use the retrieved information in the FEC decoding process. If the FEC block was not decodable then the adaptive FEC algorithm is invoked at 495. That is, the client proxy joins a delayed FEC multicast group and requests delayed FEC packets. A test is then performed at 497 to determine if ARQ is needed. ARQ would be needed if the delayed FEC packets were insufficient to recover the lost/damaged packets/data. ARQ here includes ARQ FEC packet and ARQ Source/Content packet requests. This includes joining ARQ FEC and ARQ Source/Content multicast groups. If ARQ is needed then an ARQ request is inserted into the ARQ event queue at 499. Processing then returns to 430. If ARQ is not needed, then processing then returns to 430.

If the FEC block was decodable then the recovered packet(s) is/are inserted into the source buffer at 490. Media or FEC packets received after a FEC has been decoded are dropped. When all the media packets for a FEC block are sent out to the display, the FEC block structure is cleared and memory is freed. Adaptive FEC is then activated at 491 to decide if the client has received unnecessary parity packets and needs to leave/unjoin the already joined FEC groups. Processing then returns to 430.

If the received packet is not a FEC packet then a test is performed at 445 to determine if the received packet is a media packet. If the received packet is a media packet then the media packet is processed at 470. When a client/mobile device receives a media packet, the received media packet is inserted into the data structure (e.g., linked list) according to the sequence number. If a media packet is received after the FEC block to which this packet belongs has been allocated, the client/mobile device is able to locate this FEC block structure from the linked list based on the sequence number of the media packet, the base sequence number, N and K of the FEC block. The client/mobile device marks this media packet and updates the FEC block information. Processing then proceeds to 485.

It is also possible that the parity packets for a certain FEC block are totally lost, for example, in a hand off. The client/mobile device may not be able to obtain any FEC information about the media packets that belong to this FEC block. If the difference between the last unmarked media packet and the first unmarked media packet exceeds a certain threshold (for example, the 3/2 the estimated value of K), the client/mobile device concludes that all FEC packets for these media packets are lost/damaged (FEC block is not decodable). The client/mobile device will then activate the adaptive FEC algorithm or ARQ request processing of the present invention without any FEC information about these media packets.

If the received packet is not a media packet, then a test is performed at 450 to determine is the received packet is an ARQ packet. If the received packet is an ARQ packet then ARQ suppression is performed at 475 to prevent an ARQ feedback explosion problem. Processing then returns to 430.

If the received packet is not an ARQ packet then a test is performed at 455 to determine if the received packet is a RTCP packet. If the received packet is a RTCP packet then the RTCP packet is processed at 480. The received RTCP packets are inserted into the source buffer according to the time that they were received since sequence numbers in the RTCP packets are not assigned according to the RTP packets. Processing then returns to 430. If the received packet is not a RTCP packet then the received packet is dropped at 460. Processing then returns to 430.

FIG. 4C is a flowchart of the second thread of the method practiced by the client proxy module 330 of FIG. 3. The second thread handles source packet forwarding. At 433 a test is performed to determine if the source buffer is empty. If the source buffer is empty then processing returns and is in a wait state until the source buffer is no longer empty. The test at 433 can be performed on some time basis or any other convenient basis such that a determination can be made regarding the status of the source buffer. If the source buffer is not empty then a test is performed at 443 to determine if the packet buffer time for the head packet has expired. The head packet is the next packet in the buffer to be handled. Since the method of the present invention may use a linked list data structure, the next packet in the buffer may not be the next packet in the structure but rather the next packet to be handled may be the next packet pointed to by a linked list pointer. If the buffer time has expired then the head packet is forwarded to a media player or media display device at 453. That is, if a received media or RTCP packet remains in the buffer for greater than time T, then the client/mobile device forwards the packet to the media player. The pointer to the head packet is set to the next packet in the source buffer at 463. Processing then returns to 433. If the head packet buffer time has not expired then processing returns to 433.

FIG. 4D is a flowchart of the third thread of the method practiced by the client proxy module 330 of FIG. 3. The third thread handles the ARQ processing. At 437 a test is performed to determine if the event queue buffer is empty. If the event queue buffer is empty then processing returns and is in a wait state until the event queue buffer is no longer empty. The test at 437 can be performed on some time basis or any other convenient basis such that a determination can be made regarding the status of the event queue buffer. If the event queue buffer is not empty then a test is performed at 447 to determine if the head event timer has expired. The head event timer is the timer for handling the next event in the event queue. If the head event timer has expired then an ARQ request is sent out at 457. The head event timer is set to point to the next event in the event queue at 467. Processing then returns to 437. If the head event timer has not expired, then processing returns to 437.

Figure 5:
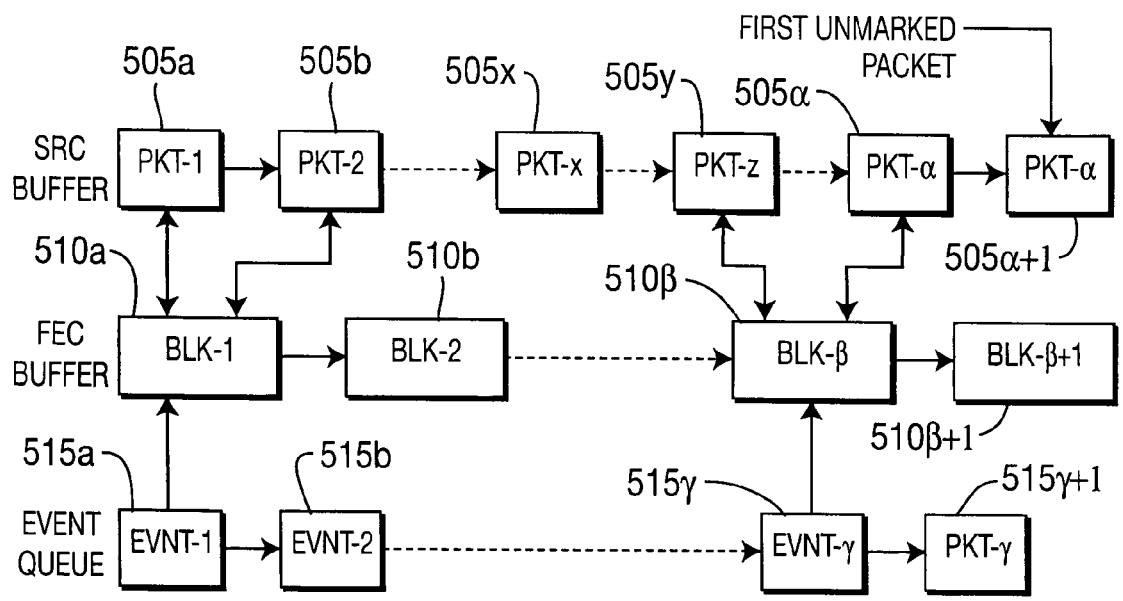
FIG. 5 is a diagram of the data structures of the client side proxy of the present invention.

The main data structure at the client side is shown in FIG. 5. A client/mobile device maintains a source buffer (media buffer) for each track of the media stream in a session. The source buffer buffers T seconds of media packets. The source buffer may be implemented using a linked list data structure. The data structures of the present invention described below are used by the processes of FIGS. 4A, 4B, 4C and 4D. The data structures are used at multiple points in time and for multiple purposes in the processes of FIGS. 4A, 4B, 4C and 4D.

An FEC block includes one or more media packets (up to k media packets). Thus a media packet is said to belong to a FEC block. The FEC block also includes one or more FEC (parity) packets (up to n-k parity/FEC packets). Thus, FEC/parity packets are said to belong to an FEC block. Here n is the FEC block size, and k is the number of media packets in a FEC block. A media packet is marked if the FEC block to which it belongs has been allocated. Thus, if the FEC block has been allocated, the client/mobile device is able to locate this FEC block structure from the linked list based on the sequence number of the media packet, the base sequence number, and N and K of the FEC block.

In the implementation of the present invention, during the FEC encoding at the server side, media packets are not modified. All the information about FEC encoding parameters are included in the FEC packets. The implementation is backward compatible because even if a client/mobile device does not support FEC, it still can join the media multicast group, receive the media packets and playback the received content.

When a client/mobile device receives a media packet, the received media packet is inserted into the source buffer data structure (e.g., linked list) according to the sequence number as shown in 505a, 505b, . . . , 505α+1. If the FEC block data structure to which the received media packet belongs has not been allocated yet, the client/mobile device has no information about the FEC block to which this media packet belongs. A media packet does not include any information about the FEC block. Also the present invention does not use fixed N and K in FEC encoding (rather MaxN and MaxK are fixed), the FEC block index information cannot be derived from the sequence number. If there is no information about the FEC block to which a media packet belongs, the media packet is not marked.

It should be noted that real-time transport control protocol (RTCP) packets for a media track are also inserted into a corresponding source buffer data structure (e.g., linked list). Sequence numbers in the RTCP packets are not assigned according to the RTP packets. Rather RTCP packets are inserted into the source buffer according to the time that the RTCP packets were received.

If a media or RTCP packet remains in the buffer for greater than a predetermined or configurable time T, then the client/mobile device sends the packet to the media player.

A client/mobile device also maintains a FEC block buffer data structure. This data structure may also be implemented as a linked list, each element in the linked list is a FEC block data structure which includes all the information about a FEC block, such as the base sequence number, N and K, etc.

When a client/mobile device receives a parity (FEC) packet, the client/mobile device gets all the information about the FEC block to which this parity packet belongs from the FEC block header. The client/mobile device first checks if a block data structure has been allocated to the FEC block. If a block data structure has not yet been allocated, then a block data structure is allocated. A FEC block data structure is inserted into the data structure (e.g., linked list) according to its base sequence number as shown in 510a, 510b, . . . , 510β+1. The base sequence number of a FEC block is the smallest sequence number of the media packets that belong to this FEC block. After a FEC block has been allocated, the client/mobile device looks into the source buffer and marks the media packets that belong to this FEC block, and updates the information (such as how many packets are lost, which packets are lost, etc.) corresponding to this block. The information is used in the adaptive FEC of the present invention. The information is also used in the FEC decoding (485 and 490 of FIG. 4B). Subsequently, if a media packet or a FEC packet is received for this FEC block, the information of this block is updated correspondingly.

If a media packet is received after the FEC block to which this packet belongs has been allocated, the client/mobile device is able to locate this FEC block structure from the linked list based on the sequence number of the media packet, the base sequence number, N and K of the FEC block. The client/mobile device marks this media packet and updates the FEC block information.

A FEC block data structure includes an array of pointers that point to all the media packets that belong to this block. It also includes a decode buffer that is used to store FEC packets for this block. A memory buffer, that is required to perform FEC decoding, is also allocated in the decode buffer.

If a FEC block is decodable, FEC decoding is performed and the recovered media packets are inserted into the source buffer. Media or FEC packets received after a FEC block has been decoded are dropped. When all the media packets for a FEC block are sent out to the display, the FEC block structure is cleared and memory is freed.

It is also possible that the parity packets for a certain FEC block are totally lost, for example, in a hand off. The client/mobile device may not be able to obtain any FEC information about these media packets. A client/mobile device also keeps a pointer to the first unmarked media packet in the source buffer, in FIG. 5, pkt—(α+1) is the first unmarked packet.

If the difference between the last unmarked media packet and the first unmarked media packet exceeds a certain threshold (for example, the 3/2 the estimated value of K), the client/mobile device concludes that all FEC packets for these media packets are lost/damaged (FEC block is not decodable). The client/mobile device will then activate the adaptive FEC algorithm or ARQ request processing of the present invention without any FEC information about these media packets. Because in the present invention, K is not fixed, a client/mobile device keeps an estimation of the average value of K.

Each client/mobile device maintains an event queue data structure. An event may be an ARQ processing event, which includes all the information for a client/mobile device to send an ARQ request or process ARQ suppression. Each event is inserted into the event queue according to their expiration time as shown in 515a, 515b, 515b, . . . , 515γ+1. An event may also be a check event. For an example, after a client/mobile device sends an ARQ request, the client/mobile device may insert a check event into the event queue for the client/mobile device to check at a later time to determine if it has received the retransmission parity packets and was able to decode a FEC block. If the client/mobile device has not received and decoded the retransmission packet, the client/mobile device may send another ARQ request.

A multicast session has one media group represented by media_group. Each media track in the multicast session also has a number of FEC groups. The number of FEC groups may be different, for example, for audio and video tracks as discussed above. The adaptive FEC and ARQ algorithm are deployed for each media track separately. In the following discussion, it is assumed that a multicast session that has only one media track to describe the adaptive FEC and ARQ algorithm. For a multimedia session with multiple tracks, the method can be used for each track.

Assuming that a stream has a total of m+1 FEC groups (group (0), group (1), ... group (m)), group (0) to group ($m^{-1}$) are adaptive FEC groups, group (m) is used for ARQ. The first FEC group is sent immediately after the media group (non-delayed FEC group). A client will always join the media group and the first FEC group. In the following, the group number is used to index the parameters associated with that group. For an example, the overhead of group (i) would be overhead (i), and the delay of group (i) would be delay (i). If the FEC code has a block size of n, the number of message symbols in each block would then be:

$$k = \frac{n}{1 + \sum_{i=0}^{m} \text{overhead}(i)}.$$

The number of parity symbols in each group is:

num_parity(i)=overhead(i)*k.

A client/mobile device estimates the average loss rate and its variance for the received FEC blocks as avg_loss_rate, and avg_variance respectively.

When a client/mobile device receives the first FEC packet for a FEC block, it means that the client/mobile device has received the last media packet/symbol of the current FEC block.

From the FEC header, the client/mobile device extracts all the information about this FEC block, and has the knowledge if any media packets have been lost and how many packets have been lost for this FEC block. This information is used to update the estimation of average loss and variance. At this point if the client/mobile device has already received enough packets/symbols to decode the current FEC block, the client/mobile device does not have to join any new FEC groups or send an ARQ request. However, if the client/mobile device joined more FEC groups, then the client/mobile device may receive redundant parity packets/symbols. That is, the client/mobile device may receive more parity packets/symbols than the client/mobile device needs. The client may need to leave (unjoin) those FEC groups.

Assuming that the client does not receive enough symbols to decode the current FEC block. The number of lost media/message symbols is: lost_msg=k−recv_msg. The client/mobile device needs to decide the number of FEC groups that is needs to join. One embodiment is to join all the groups at one time. A second embodiment is to join one additional FEC group first. After some delay, the client/mobile device then checks to determine if it has received enough packets/symbols to decode the FEC block. If riot, the client/mobile device joins the next FEC group.

In a first embodiment, the number of symbols that are needed can be estimated by:

req_sym=lost_msg*(1+avg_loss_rate)+
α*avg_variance

In wireless networks, the packet loss variance can be very large. Thus most of the time, the client/mobile device may overestimate the parity symbols needed. However, it is still possible to underestimate the requested symbols, which causes undecodable FEC block(s). The number of groups that the client/mobile device needs to join would then be:

$$g = \min\left(j: \sum_{i=1}^{j} \text{num\_parity}(i) \geq \text{req\_sym}\right) \quad (1)$$

$$j \leq m-1$$

When the client/mobile device joins a multicast FEC group, the client/mobile device needs to specify the duration that the client/mobile device should remain joined to this group. This is specified by the grp_expire parameter.

grp_expire(i)=current_time+delay(i)+Te i≦m−1    (2)

where Te is a configurable parameter, for example Te=500 ms. If the client/mobile device joins all the adaptive FEC groups but still cannot decode the FEC block, the client/mobile device will have to send an ARQ request. To cope with the feedback explosion, the ARQ request is not sent immediately. An ARQ request timer is inserted into the event queue, the expiration time of the timer is set between (K−lost_msg)*$T_s$ and (K−lost_msg+1)*$T_s$. This way, the client/mobile device that has lost the most packets will send the ARQ request first. The ARQ request will be multicast to the ARQ request multicast group. Other clients/mobile devices, on receiving this ARQ request, will compare the number of requested parity packets in the received ARQ request to its own needs. If the number parity packets requested by another client/mobile device is bigger than its own request, the client/mobile device will suppress its own ARQ request and wait to get the multicast which will have more parity packets than it needs.

In the second embodiment, the client/mobile device first joins one additional delayed FEC group. A timer is set. The timer should expire sometime before the delay time of the next delayed FEC group. If the client/mobile device then determines that it can still not decode the FEC block, the client/mobile device has time to join the next FEC group. For example, if the IGMP join latency is between several to about 50 ms, the timer expiration time is specified as Tx=100 ms before the next FEC group delay time:

timer_expire(i)=current_time+delay(i+1)−Tx    (3)

where Tx is a configurable parameter. Again, if the FEC group has already been joined, the client/mobile device just needs to update the expiration time of the group, but the timer still has to be set. When the client/mobile device has joined the last adaptive FEC group but still cannot decode the FEC block, the client/mobile device will have to send an ARQ request.

In some scenarios, if the number of lost media packets in a FEC block exceeds a threshold (for example, 50% of K), it may not be efficient to send an ARQ to ask only for parity packets. In this case, the client/mobile device can send an ARQ to ask the retransmission of the original media packets.

If the client/mobile device received enough packets/symbols to decode the FEC block or if the client/mobile device needs less parity symbols than that provided by the FEC groups it has joined, then the client/mobile device needs to check if it should leave (unjoin) one or more FEC multicast groups. Equation (1) gives the number of FEC groups that a client/mobile device should join, if the currently joined group number 1 is bigger than g, then the client/mobile device should leave group (g+1) to group (l). To reduce the number of joins and leaves, another parameter is introduced. Let $$h = \min\left(j : \sum_{i=1}^{j} \text{over\_head}(i) \geq \text{avg\_loss\_rate}\right) \quad (4)$$

and t=max(g, h), if l>t, then the client/mobile device leaves group (t+1) to group (l).

Figure 6:
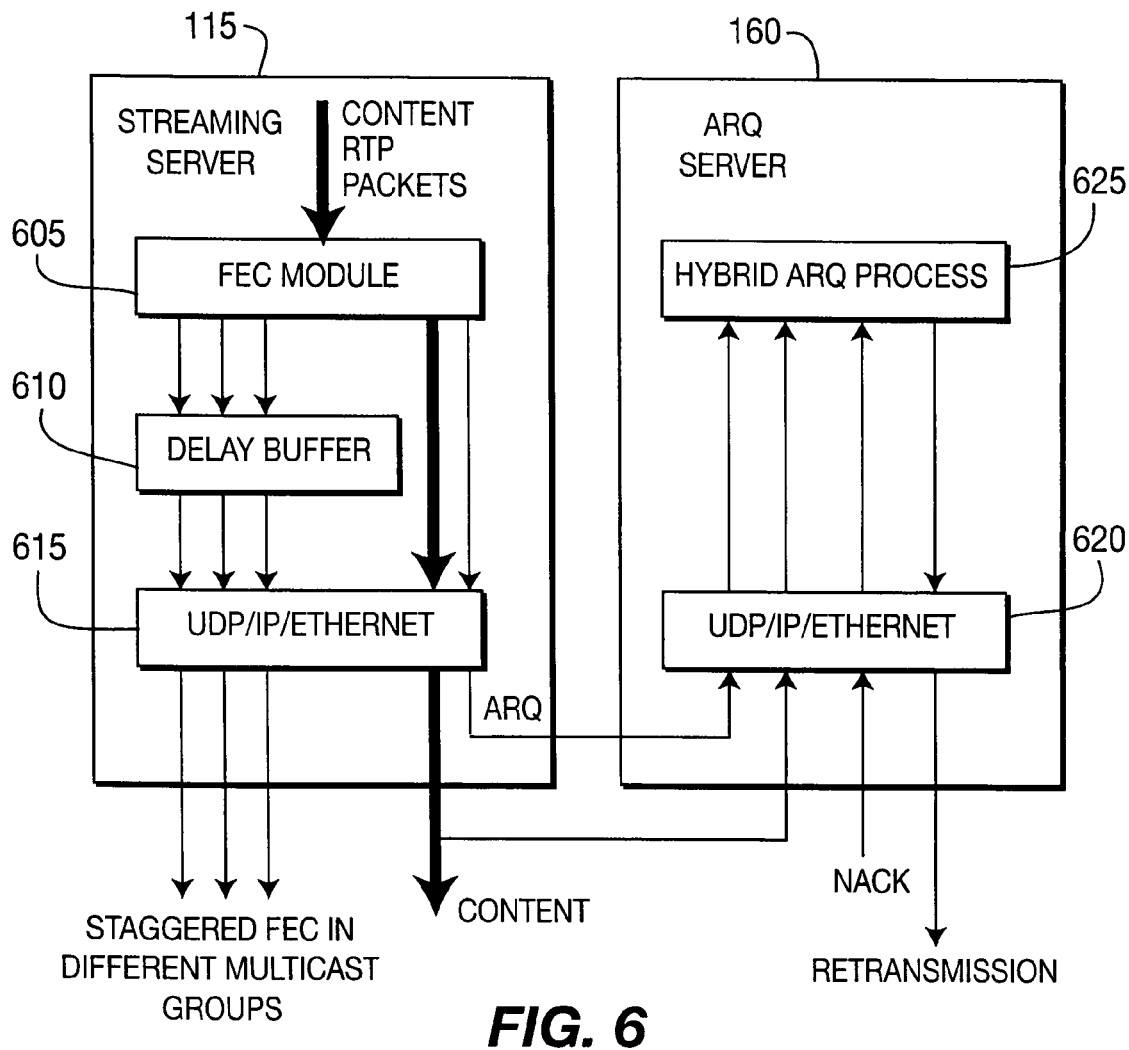
FIG. 6 is a schematic/block diagram of the server side of the merged hybrid ARQ method of the present invention.

FIG. 6 is a schematic/block diagram of the server side of the merged hybrid ARQ method of the present invention. Specifically, FIG. 6 depicts a streaming server 105 and an ARQ server 160 of the present invention. As indicated above, the streaming server and the ARQ server can be placed on different machines or co-located on one machine. Streaming server 105 receives content from content server 105 and/or live content server 110 in the form of content RTP (media) packets. FC module 605 allocates these media packets to a FEC block and FEC/parity packets are generated and added to the FEC block such that there are k media packets and n-k parity/FEC packets in a FEC block. The FEC/parity packets are separated into layers representing increasing parity/FEC that can be requested and used by a client/mobile device in the event that the FEC block (including the media and non-delayed FEC packets) was insufficient to recover the content. The client/mobile device requests additional FEC by joining the multicast groups that provide the additional FEC. The additional FEC is stored in a delay buffer 610 in the event that it is needed. All data (media, non-delayed FEC, and delayed FEC) are forwarded to a client/mobile device via UDP/IP/Ethernet protocol stack 615.

The content (media packets) are forwarded to ARQ server 160 by streaming server 115 Streaming server 115 also forwards the FEC packets in the ARQ FEC group to ARQ server 160. Both content and ARQ FEC packets are forwarded via UDP/IP/Ethernet protocol stack 620 to hybrid ARQ process module 625. When a client/mobile terminal sends a NACK requesting for retransmission of FEC packets or content packets, it joins an ARQ retransmission multicast group in order to receive the retransmission of FEC packets or content packets. There are several types of NACK/ARQ requests. In one type of NACK/ARQ request, a client/mobile device asks for the number of FEC packets that it needs; In another type of NACK/ARQ request, a client/mobile device requests the ARQ server to retransmit specific content packets. In this case, the NACK/ARQ request include the sequence number of the content packets that the client/mobile device needs. A third type of NACK/ARQ request is the combination of the above two NACK/ARQ requests. In the third case, a client/mobile device requests a certain number of FEC packets and some content packets. When a NACK is received from a client/mobile terminal, the retransmission of the original content or the FEC packets of the ARQ group is processed by the hybrid ARQ process module 625 and transmitted by UDP/IP/Ethernet protocol stack 620

It is to be understood that the present invention may be implemented in various forms of hardware, software, firmware, special purpose processors, or a combination thereof. Preferably, the present invention is implemented as a combination of hardware and software. Moreover, the software is preferably implemented as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof), which is executed via the operating system. In addition, various other peripheral devices may be connected to the computer platform such as an additional data storage device and a printing device.

It is to be further understood that, because some of the constituent system components and method steps depicted in the accompanying figures are preferably implemented in software, the actual connections between the system components (or the process steps) may differ depending upon the manner in which the present invention is programmed. Given the teachings herein, one of ordinary skill in the related art will be able to contemplate these and similar implementations or configurations of the present invention.

The invention claimed is:

1. A method for increasing multicasting reliability, said method comprising:
generating a plurality of layers of forward error correction coded packets;
receiving a request to join a first multicast group in order to receive content and said first layer of said plurality of layers of forward error correction coded packets;
transmitting said content and a first layer of said plurality of said forward error correction coded packets;
receiving a request to join a second multicast group in order to receive said second layer of said plurality of layers of forward error correction coded packets if said content was not recoverable from said content and said first layer of a plurality of said forward error correction coded packets from said first multicast group; and
transmitting a second layer of said plurality of said forward error correction coded packets upon receipt of the request, wherein said transmission of said second layer of said plurality of said forward error correction coded packets is delayed.

2. The method according to claim 1, further comprising:
transmitting a third layer of said plurality of said forward error correction coded packets upon receipt of a third request; and
re-transmitting said content and a fourth layer of said plurality of said forward error correction coded packets, upon receipt of a fourth request.

3. The method according to claim 1, further comprising receiving a request to join a third multicast group in order to receive said third layer of said plurality of layers of forward error correction coded packets if said content was not recoverable from said received content, said first layer of said plurality of said forward error correction coded packets and said second layer of said plurality of forward error correction coded packets, wherein said transmission of said third layer of said plurality of said forward error correction coded packets is delayed.

4. The method according to claim 1, further comprising receiving an automatic repeat request negative acknowledgement and receiving a request to join a fourth multicast group in order to receive re-transmission lost content and a fourth layer of said plurality of layers of forward error correction coded packets if said content was not recoverable from said received content, said first layer of said plurality of said forward error correction coded packets, said second layer of said plurality of forward error correction coded packets and said third layer of said plurality of forward error correction coded packets, wherein said transmission of re-transmission of said lost content and said fourth layer of said plurality of layers of forward error correction coded packets is delayed.

5. The method according to claim 1, wherein said re-transmission of said lost content and said fourth layer of said plurality of said forward error correction coded packets are re-transmitted by an automatic repeat request server.

6. The method according to claim 1, wherein said second layer of said plurality of said forward error correction coded packets are transmitted by a streaming server.

7. The method according to claim 1, wherein said second layer of said plurality of said forward error correction coded packets is delayed in time by a configurable period of time.

8. The method according to claim 1, wherein an amount of forward error correction coding applied at each of said plurality of layers is configurable.

9. The method according to claim 1, wherein said content includes multiple media tracks.

10. A system for increasing multicasting reliability, comprising:
   means for generating a plurality of layers of forward error correction coded packets;
   means for receiving a request to join a first multicast group in order to receive content and said first layer of said plurality of layers of forward error correction coded packets;
   means for transmitting said content and a first layer of said plurality of said forward error correction coded packets;
   means for receiving a request to join a second multicast group in order to receive said second layer of said plurality of layers of forward error correction coded packets if said content was not recoverable from said content and said first layer of a plurality of said forward error correction coded packets from said first multicast group; and
   means for transmitting a second layer of said plurality of said forward error correction coded packets upon receipt of a first request, wherein said transmission of said second layer of said plurality of said forward error correction coded packets is delayed.

11. The system according to claim 10, further comprising:
   means for transmitting a third layer of said plurality of said forward error correction coded packets upon receipt of an automatic repeat request message; and
   means for re-transmitting said content and a fourth layer of said plurality of said forward error correction coded packets, upon receipt of an automatic repeat request content request.

12. The system according to claim 10, further comprising means for receiving a request to join a third multicast group in order to receive said third layer of said plurality of layers of forward error correction coded packets if said content was not recoverable from said received content, said first layer of said plurality of said forward error correction coded packets and said second layer of said plurality of forward error correction coded packets, wherein said transmission of said third layer of said plurality of said forward error correction coded packets is delayed.

13. The system according to claim 10, further comprising means for receiving an automatic repeat request negative acknowledgement and receiving a request to join a fourth multicast group in order to receive said content and a fourth layer of said plurality of layers of forward error correction coded packets if said content was not recoverable from said received content, said first layer of said plurality of said forward error correction coded packets, said second layer of said plurality of forward error correction coded packets and said third layer of said plurality of forward error correction coded packets, wherein said transmission of said content and said fourth layer of said plurality of layers of forward error correction coded packets is delayed.

14. The system according to claim 10, wherein said content and said a fourth layer of said plurality of said forward error correction coded packets are re-transmitted by an automatic repeat request server.

15. The system according to claim 10, wherein said second layer of said plurality of said forward error correction coded packets are transmitted by a streaming server.

16. The system according to claim 10, wherein each of said second layer of said plurality of said forward error correction coded packets is delayed in time by a configurable period of time.

17. The system according to claim 10, wherein an amount of forward error correction coding applied at each of said plurality of layers is configurable.

18. The system according to claim 10, wherein said content includes multiple media tracks.

19. A method for increasing multicasting reliability, said method comprising:
   receiving content and a first layer of a plurality of a forward error correction coded packets from a first multicast group;
   joining said first multicast group in order to receive said content and said first layer of said plurality of said forward error correction coded packets; and
   joining an additional multicast group in order to receive one of additional layers of forward error correction coded packets and said content along with a further additional layer of said plurality of forward error correction coded packets.

20. The method according to claim 19, wherein said joining act is performed if said content was not recoverable from said content and said first layer of a plurality of said forward error correction coded packets from a first multicast group.

21. The method according to claim 19, further comprising joining said first multicast group in order to receive said content and said first layer of said plurality of said forward error correction coded packets.

22. The method according to claim 21, wherein joining a second multicast group in order to receive a second layer of said plurality of said forward error correction coded packets is performed, if said content was not recoverable from said received content and said first layer of said plurality of said forward error correction coded packets.

23. The method according to claim 22, wherein joining a third multicast group in order to receive a third layer of said plurality of said forward error correction coded packets is performed, if said content was not recoverable from said received content, said first layer of said plurality of said forward error correction coded packets and said second layer of said plurality of forward error correction coded packets.

24. The method according to claim 23, wherein joining a fourth multicast group in order to receive lost content and a fourth layer of said plurality of said forward error correction coded packets is performed, if said content was not recoverable from said received content, said first layer of said plurality of said forward error correction coded packets, said second layer of said plurality of forward error correction coded packets and said third layer of said plurality of forward error correction coded packets.

25. The method according to claim 24, wherein a decision to join said fourth multicast group is made if a number of lost content packets exceeds a threshold and further comprises transmitting an automatic repeat request negative acknowledgement.

26. The method according to claim 19, further comprising forwarding recovered content to a playing device.

27. The method according to claim 19, wherein said acts are performed by a client proxy module.

28. The method according to claim 19, wherein a plurality of additional multicast groups are joined concurrently.

29. The method according to claim 19, wherein said content includes multiple media tracks.

30. An apparatus for increasing multicasting reliability, comprising:
   means for receiving content and a first layer of a plurality of a forward error correction coded packets from a first multicast group;
   means for joining said first multicast group in order to receive said content and said first layer of said plurality of said forward error correction coded packets; and
   means for joining an additional multicast groups in order to receive one of additional layers of forward error correction coded packets and said content along with a further additional layer of said plurality of forward error correction coded packets.

31. The apparatus according to claim 30, further comprising means for joining said first multicast group in order to receive said content and said first layer of said plurality of said forward error correction coded packets.

32. The apparatus according to claim 31, wherein means for joining a second multicast group in order to receive a second layer of said plurality of said forward error correction coded packets is activated, if said content was not recoverable from said received content and said first layer of said plurality of said forward error correction coded packets.

33. The apparatus according to claim 32, wherein means for joining a third multicast group in order to receive a third layer of said plurality of said forward error correction coded packets is activated, if said content was not recoverable from said received content, said first layer of said plurality of said forward error correction coded packets and said second layer of said plurality of forward error correction coded packets.

34. The apparatus according to claim 33, wherein means for joining a fourth multicast group in order to receive again said content and a fourth layer of said plurality of said forward error correction coded packets is activated, if said content was not recoverable from said received content, said first layer of said plurality of said forward error correction coded packets, said second layer of said plurality of forward error correction coded packets and said third layer of said plurality of forward error correction coded packets.

35. The apparatus according to claim 34, wherein a decision to join of said fourth multicast group is made if a number of lost content packets exceeds a threshold and further comprises means for transmitting an automatic repeat request negative acknowledgement.

36. The apparatus according to claim 30, further comprising means for forwarding recovered content to a playing device.

37. The apparatus according to claim 30, comprising a client proxy module.

38. The apparatus according to claim 30, wherein a plurality of multicast groups are joined concurrently.

39. The apparatus according to claim 30, wherein said content includes multiple media tracks.

40. The apparatus according to claim 30, wherein said joining means is executed if said content was not recoverable from said content and said first layer of a plurality of said forward error correction coded packets from a first multicast group.

* * * * *